(12) United States Patent
Chung (10) Patent No.: US 7,212,255 B2
(45) Date of Patent: May 1, 2007

(54) LIQUID CRYSTAL DISPLAY DEVICE AND FABRICATING METHOD THEREOF

(75) Inventor: Jae Young Chung, Pusan-shi (KR)

(73) Assignee: LG.Phillips LCD Co., Ltd., Seoul (KR)

( * ) Notice: Subject to any disclaimer, the term of this patent is extended or adjusted under 35 U.S.C. 154(b) by 91 days.

(21) Appl. No.: 10/024,178

(22) Filed: Dec. 21, 2001

(65) Prior Publication Data

US 2002/0085134 A1    Jul. 4, 2002

(30) Foreign Application Priority Data

Dec. 30, 2000   (KR)   ............... 10-2000-0087286

(51) Int. Cl.
  *G02F 1/1343* (2006.01)
  *G02F 1/13* (2006.01)
  *H01L 29/04* (2006.01)

(52) U.S. Cl. .................... 349/38; 349/39; 257/59; 257/72; 438/149; 438/166; 359/54; 359/59; 357/4

(58) Field of Classification Search ............ 349/38, 349/43, 143, 42, 129, 144, 39, 139, 148, 349/44, 46, 110, 111
See application file for complete search history.

(56) References Cited

U.S. PATENT DOCUMENTS

| | | | | |
|---|---|---|---|---|
| 5,182,661 A | * | 1/1993 | Ikeda et al. ............... | 349/38 |
| 5,694,185 A | * | 12/1997 | Oh ........................... | 349/46 |
| 5,724,107 A | * | 3/1998 | Nishikawa et al. ........ | 349/38 |
| 5,780,871 A | * | 7/1998 | den Boer et al. .......... | 257/59 |
| 5,796,448 A | * | 8/1998 | Kim .......................... | 349/39 |
| 5,808,706 A | * | 9/1998 | Bae .......................... | 349/38 |
| 6,052,162 A | * | 4/2000 | Shimada et al. ........... | 349/38 |
| 6,057,896 A | * | 5/2000 | Rho et al. ................. | 349/42 |
| 6,256,076 B1 | * | 7/2001 | Bae et al. .................. | 349/38 |
| 6,285,431 B2 | * | 9/2001 | Lyu et al. ................. | 349/143 |
| 6,326,641 B1 | * | 12/2001 | Choi ......................... | 257/57 |
| 6,448,579 B1 | * | 9/2002 | Lim et al. .................. | 257/59 |
| 6,476,419 B1 | * | 11/2002 | Yasuda ..................... | 257/72 |
| 6,597,415 B2 | * | 7/2003 | Rho et al. ................. | 349/42 |
| 2001/0001567 A1 | * | 5/2001 | Lyu et al. ................. | 349/143 |

* cited by examiner

*Primary Examiner*—Leonardo Andujar
*Assistant Examiner*—Fazli Erdem
(74) *Attorney, Agent, or Firm*—Birch, Stewart, Kolasch & Birch, LLP

(57) ABSTRACT

A liquid crystal display device and fabricating method, wherein at least two storage capacitors disposed between the gate line and the capacitor electrode making the same potential as the gate line are provided, whereby the capacitance of the entire storage capacitor is enlarged due to a parallel connection of the capacitors, so that flicker and cross talk can be reduced to improve picture quality.

20 Claims, 11 Drawing Sheets

LIQUID CRYSTAL DISPLAY DEVICE AND FABRICATING METHOD THEREOF

BACKGROUND OF THE INVENTION

1. Field of the Invention

The present invention relates to a liquid crystal display, and more particularly to a liquid crystal display device and a fabricating method thereof that are adaptive for improving picture quality.

2. Description of the Related Art

Generally, a liquid crystal display (LCD) controls light transmittance using an electric field to display a picture. To this end, the LCD includes a liquid crystal panel having liquid crystal cells arranged in a matrix type, and a driving circuit for driving the liquid crystal panel. The liquid crystal panel is provided with pixel electrodes for applying an electric field to each liquid crystal cell, and a common electrode. Typically, the pixel electrode is provided on a lower substrate for each liquid crystal cell, whereas the common electrode is integrally formed on the entire surface of an upper substrate. Each of the pixel electrodes is connected to a thin film transistor (TFT) used as a switching device. The pixel electrode drives the liquid crystal cell, along with the common electrode, in accordance with a data signal applied via the TFT.

Figure 1:
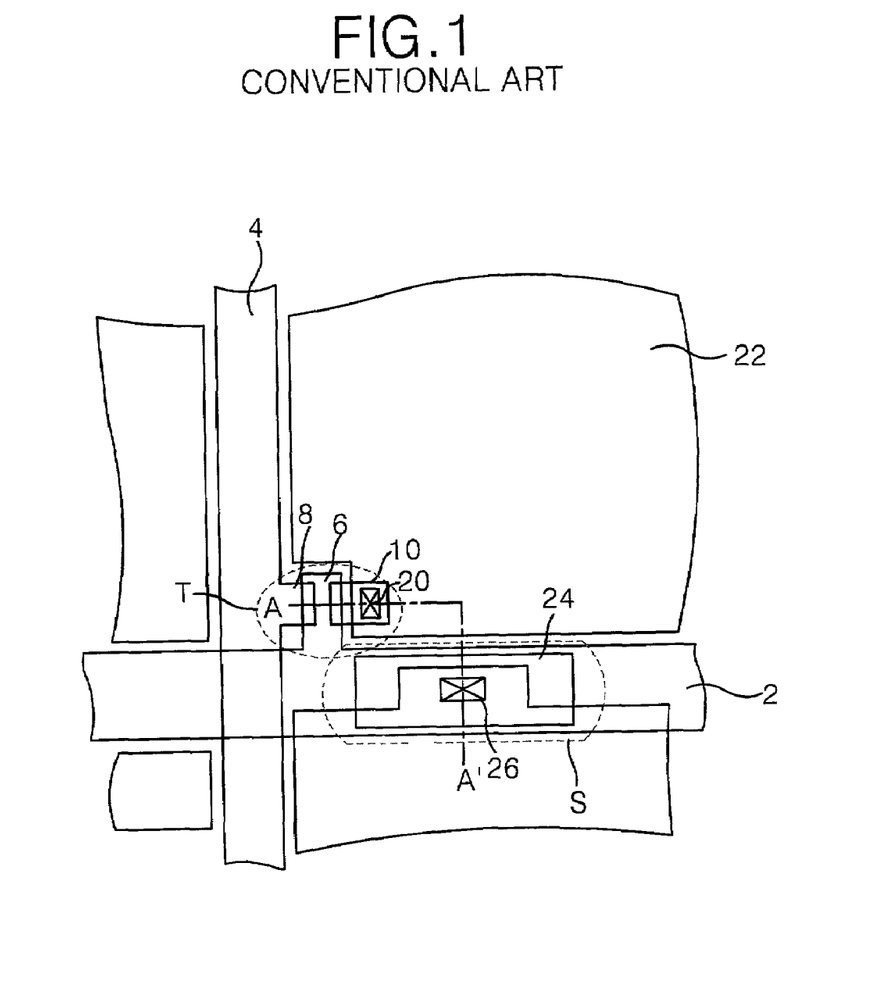
FIG. 1 is a plan view showing the structure of a lower substrate of a conventional liquid crystal display.
Figure 2:
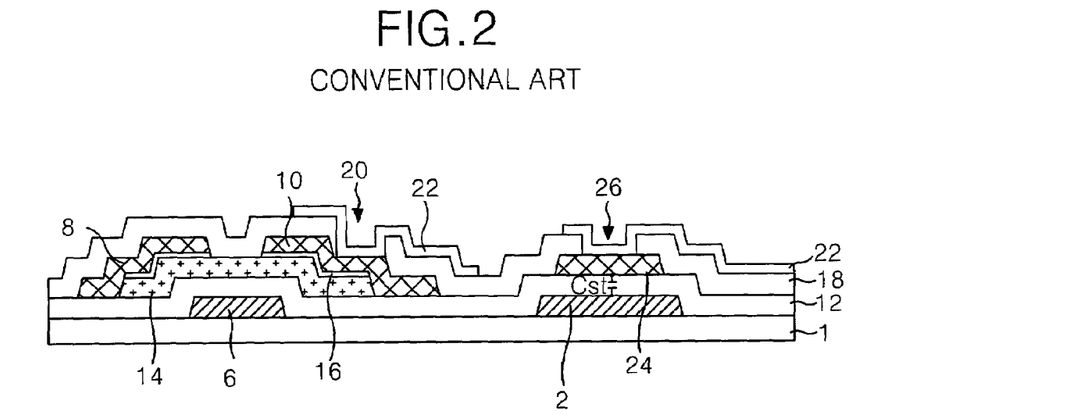
FIG. 2 is a sectional view of the lower substrate of the liquid crystal display taken along line A–A' of FIG. 1.

Referring to FIG. 1 and FIG. 2, a lower substrate 1 of a LCD includes a TFT T arranged at an intersection between a data line 4 and a gate line 2, a pixel electrode 22 connected to a drain electrode 10 of the TFT, and a storage capacitor S positioned at an overlapping portion between the pixel electrode 22 and the pre-stage gate line 2.

The TFT T includes a gate electrode 6 connected to the gate line 2, a source electrode 8 connected to the data line 4, and a drain electrode 10 connected, via a drain contact hole 20, to the pixel electrode 22. Further, the TFT T includes semiconductor layers 14 and 16 for defining a channel between the source electrode 8 and the drain electrode 10 by a gate voltage applied to the gate electrode 6. Such a TFT T responds to a gate signal from the gate line 2 to selectively apply a data signal from the data line 4 to the pixel electrode 22.

The pixel electrode 22 is positioned at a cell area divided by the data line 4 and the gate line 2 and is made from a transparent conductive material having a high light transmittance. The pixel electrode 22 generates a potential difference from a common transparent electrode (not shown) provided at an upper substrate (not shown) by a data signal applied via the drain contact hole 20. By this potential difference, a liquid crystal positioned between the lower substrate 1 and the upper substrate (not shown) is rotated due to its dielectric anisotropy. Thus, the liquid crystal allows a light applied, via the pixel electrode 22, from a light source to be transmitted into the upper substrate.

The storage capacitor S charges a voltage in an application period of a gate high voltage to the pre-stage gate line 2 while discharging the charged voltage in an application period of a data signal to the pixel electrode, to thereby prevent a voltage variation in the pixel electrode 22. The storage capacitor S consists of a gate line 2, and a storage electrode 24 overlapping with the gate line 2 and having a gate insulating film 12 disposed therebetween and being electrically connected, via a storage contact hole 26 defined at a protective film 18, to the pixel electrode 22.

A method of fabricating the lower substrate 1 of the liquid crystal display having the above-mentioned configuration will now be described.

Figure 3A:
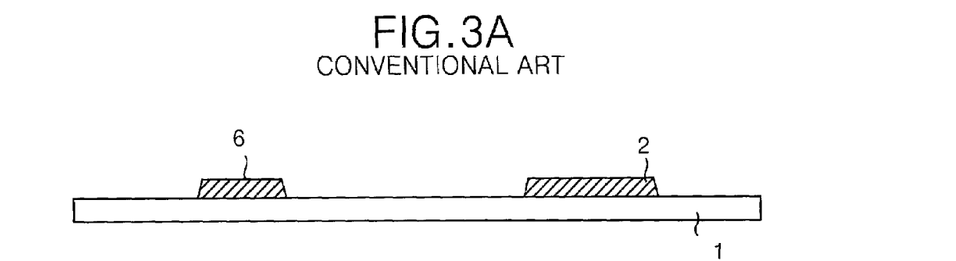
Figure 3B:
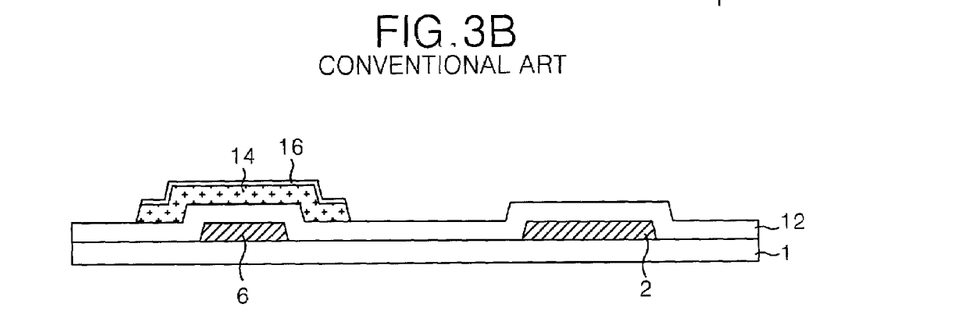

First, a gate metal layer is deposited onto the lower substrate 1 and then patterned to form the gate line 2 and the gate electrode 6 as shown in FIG. 3A. An insulating material is entirely deposited onto the lower substrate 1 in such a manner to cover the gate line 2 and the gate electrode 6, thereby forming the gate insulating film 12 as shown in FIG. 3B. First and second semiconductor layers are sequentially deposited onto the gate insulating film 12 and then patterned to form an active layer 14 and an ohmic contact layer 16.

Figure 3C:
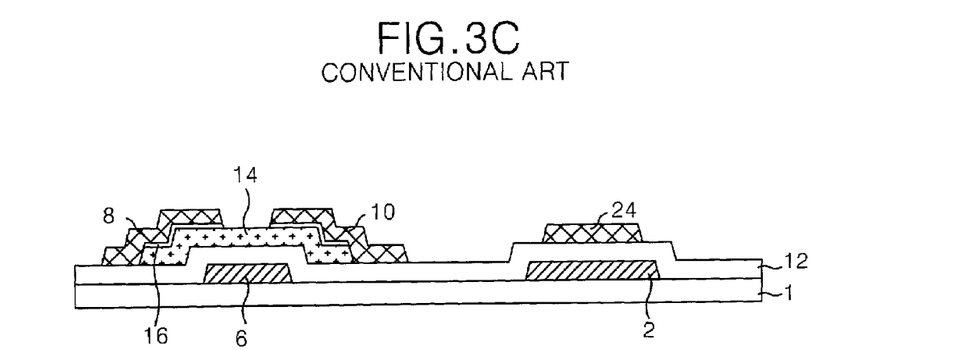

Subsequently, a data metal layer is deposited onto the gate insulating film 12 and then patterned to form the storage electrode 24, the source electrode 8 and the drain electrode 10 as shown in FIG. 3C. Thereafter, the ohmic contact layer 16 is etched to expose the active layer 14 in order to define a desired size of channel. A portion of the active layer 14 corresponding to the gate electrode 6 between the source electrode 8 and the drain electrode 10 defines a channel.

Figure 3D:
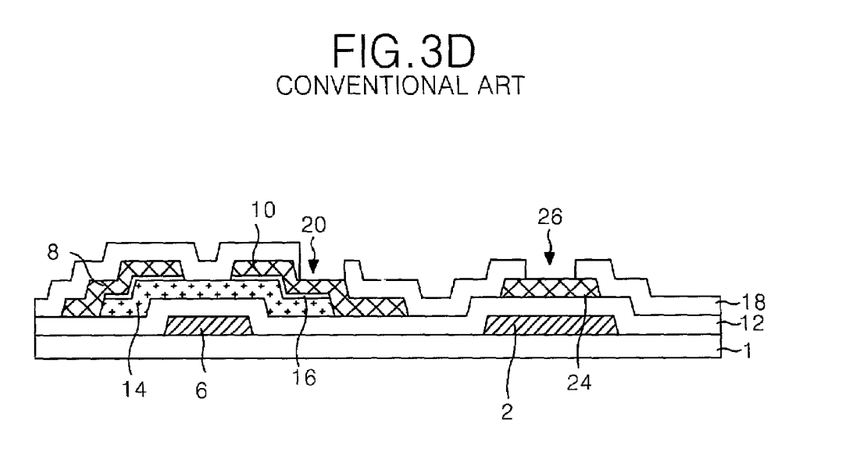

Then, a protective film 18 is formed on the gate insulating film 12 and then patterned to form the drain contact hole 20 and the storage contact hole 26 in such a manner to expose the drain electrode 10 and the storage electrode 24 as shown in FIG. 3D.

Figure 3E:
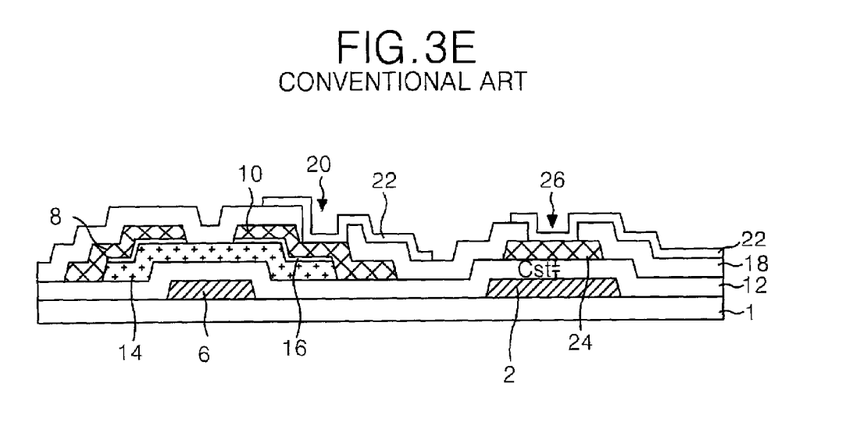

Subsequently, a transparent conductive material is deposited onto the protective layer 18 and then patterned to form the pixel electrode 22, electrically contacting the drain electrode 10 and the storage electrode 24 as shown in FIG. 3E.

In such a conventional LCD, when a gate signal applied to the gate electrode 6 is turned off and thus fallen, a feed-through voltage 8Vp corresponding to the difference between the data voltage applied to each of the data line (based on a voltage of the common electrode) and the liquid crystal cell voltage charged in the liquid crystal cell is created as indicated in the following equation:

$$\Delta Vp = \{(C_{gd}/C_{lc}+C_s+C_{gd})\}(V_{gh}-V_{gl}) \quad (1)$$

wherein $\Delta Vp$ represents the feed-through voltage; Cgd the parasitic capacitor of the gate/drain electrode; Cst the storage capacitor; Vgh the gate high voltage; and Vgl the gate low voltage.

This feed-through voltage $\Delta Vp$ is created by a parasitic capacitor existing between the gate terminal of the TFT and the liquid crystal cell Clc as can be seen from the above equation (1), and which periodically changes the amount of transmitted light of the liquid crystal cell Clc. As a result, a flicker and a residual image emerges at the picture displayed on the LCD.

In order to sufficiently restrain such a feed-through voltage $\Delta Vp$, it is necessary to enlarge the capacitance of the storage capacitor Cst, but the above-mentioned LCD structure has a limit in enlarging the capacitance of the storage capacitor Cst.

SUMMARY OF THE INVENTION

Accordingly, it is an object of the present invention to provide a liquid crystal display and a fabricating method wherein the capacitance of the storage capacitor is enlarged to improve picture quality.

In order to achieve these and other objects of the invention, a liquid crystal display device, according to one aspect of the present invention, is proved which includes at least two storage capacitors disposed between a gate line and a capacitor electrode, the gate line being connected, via a contact hole passing through said at least two storage capacitors, to the capacitor electrode.

In the liquid crystal display device, the capacitor electrode is made from a transparent conductive material, which is any one of indium-tin-oxide (ITO), indium-zinc-oxide (IZO) and indium-tin-zinc-oxide (ITZO).

The liquid crystal display device further includes a gate insulating film provided on a substrate; a storage electrode provided on the gate insulating film; and a protective layer provided between the storage electrode and the capacitor electrode.

The storage capacitor includes a first storage capacitor provided between the storage electrode and the gate line with the intervening gate insulating film; and a second storage capacitor provided between the storage electrode and the capacitor electrode with the intervening protective layer. The first storage capacitor is connected to the second storage capacitor in parallel. The contact hole is at least two holes spaced to each other at a larger length than the width of the storage electrode. The capacitor electrode has a larger length than the storage electrode.

The liquid crystal display device further includes a gate electrode connected to the gate line; source and drain electrodes provided on the gate insulating film; and a pixel electrode provided on the protective layer to be electrically connected to the drain electrode. The pixel electrode electrically contacts the storage electrode through said contact hole passing through the protective layer. The gate insulating film has a thickness of about 4000 Å and the protective layer has a thickness of about 2000 Å.

A method of fabricating the liquid crystal display device according to another aspect of the present invention includes the steps of forming a gate line on a substrate; forming a gate insulating film on the substrate; forming a storage electrode on the gate insulating film; forming a protective layer on the gate insulating film; defining at least two contact holes to expose the gate line; and forming a capacitor electrode electrically contacting the gate line on the protective layer. In this method, the capacitor electrode is made from a transparent conductive material, which is any one of indium-tin-oxide (ITO), indium-zinc-oxide (IZO) and indium-tin-zinc-oxide (ITZO).

The at least two contact holes are spaced to each other at a larger length than a width of the storage electrode. The capacitor electrode has a larger length than the storage electrode.

The method further includes the steps of forming a gate electrode connected to the gate line on the substrate; forming a semiconductor layer on the gate insulating film; forming source and drain electrodes on the semiconductor layer; and forming a pixel electrode on the protective layer. The pixel electrode electrically contacts the storage electrode through the contact hole passing through the protective layer. The gate insulating film has a thickness of about 4000 Å and the protective layer has a thickness of about 2000 Å.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects of the invention will be apparent from the following detailed description of the embodiments of the present invention with reference to the accompanying drawings, in which:

FIG. 3A to FIG. 3E are sectional views showing a process of fabricating the lower substrate of the liquid crystal display shown in FIG. 2, step by step;

FIG. 8A to FIG. 8E are sectional views showing a process of fabricating the lower substrate of the liquid crystal display shown in FIG. 5 step-by-step.

DETAILED DESCRIPTION OF THE PREFERRED EMBODIMENT

Figure 4:
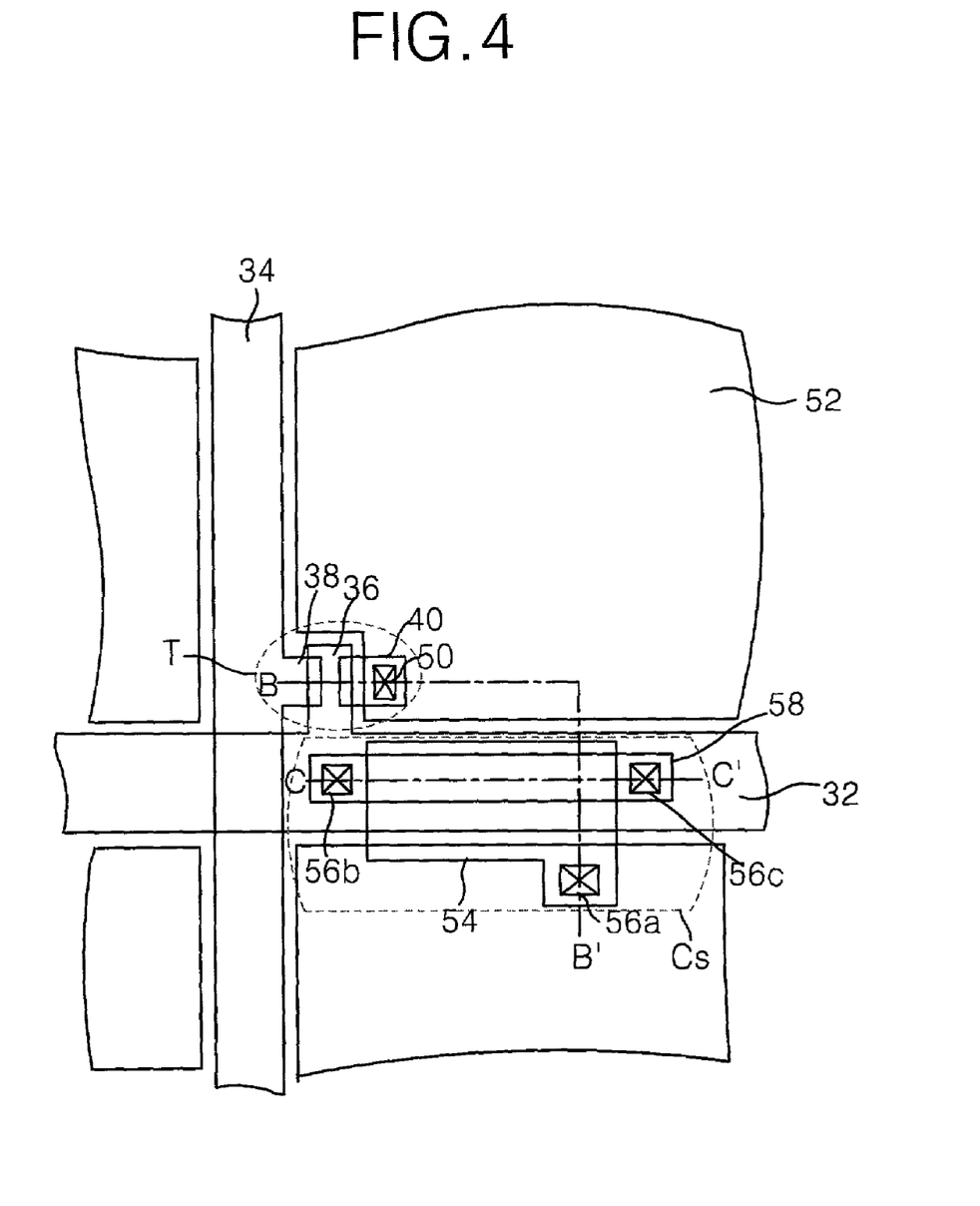
FIG. 4 is a plan view showing the structure of a lower substrate of a liquid crystal display according to an embodiment of the present invention.
Figure 5:
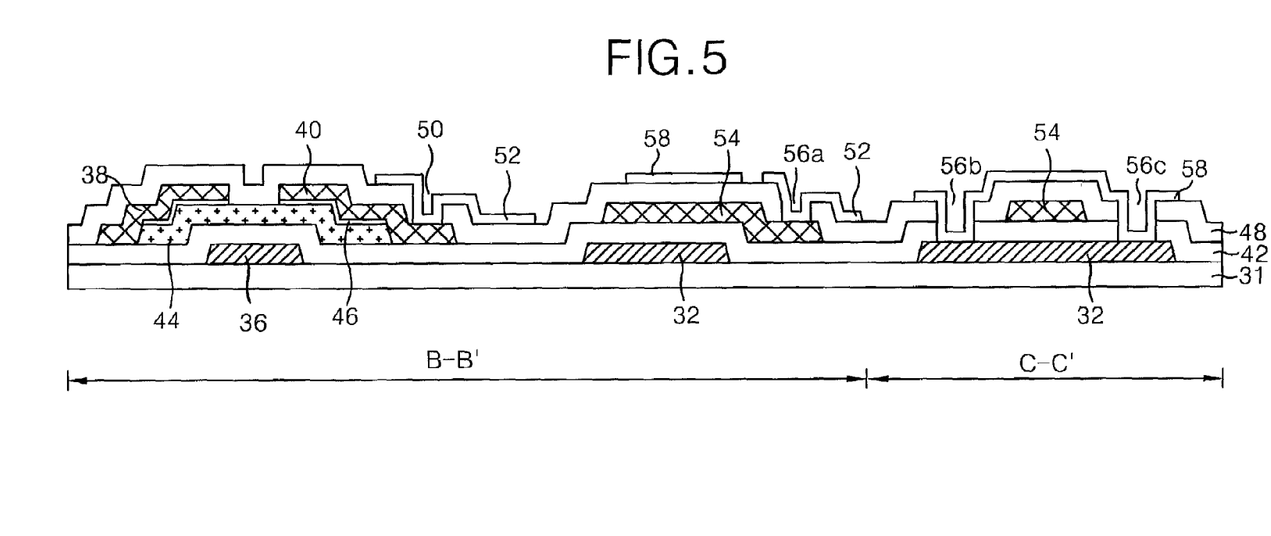
FIG. 5 is a sectional view of the lower substrate of the liquid crystal display taken along lines B–B' and C–C' of FIG. 4.

FIG. 4 and FIG. 5 are respectively a plan view and a sectional view showing the structure of a lower substrate of a liquid crystal display according to an embodiment of the present invention, which emphasizes the thin film transistor portion and the storage capacitor portion.

Referring to FIG. 4 and FIG. 5, the lower substrate 31 of the liquid crystal display (LCD) includes a TFT T arranged at an intersection between a data line 34 and a gate line 32, a pixel electrode 52 connected to a drain electrode 40 of the TFT T, and a storage capacitor Cs positioned at an overlapping portion among the pixel electrode 52, a capacitor electrode 58 and the pre-stage gate line 32.

The TFT T includes a gate electrode 36 connected to the gate line 32, a source electrode 38 connected to the data line 34, and a drain electrode 40 connected, via a drain contact hole 50, to the pixel electrode 52. Further, the TFT T includes semiconductor layers 44 and 46 for defining a channel between the source electrode 38 and the drain electrode 40 by a gate voltage applied to the gate electrode 36. The TFT T responds to a gate signal from the gate line 32 to selectively apply a data signal from the data line 34 to the pixel electrode 52.

The pixel electrode 52 is positioned at a cell area divided by the data line 34 and the gate line 32 and is made from a transparent conductive material having a high light transmittance. The pixel electrode 52 generates a potential difference from a common transparent electrode (not shown) provided at an upper substrate (not shown) by a data signal applied via the drain contact hole 50. By this potential difference, a liquid crystal positioned between the lower substrate 1 and the upper substrate (not shown) is rotated due to its dielectric anisotropy. Thus, the liquid crystal allows light applied, via the pixel electrode 52, from a light source to be transmitted into the upper substrate.

Figure 6:
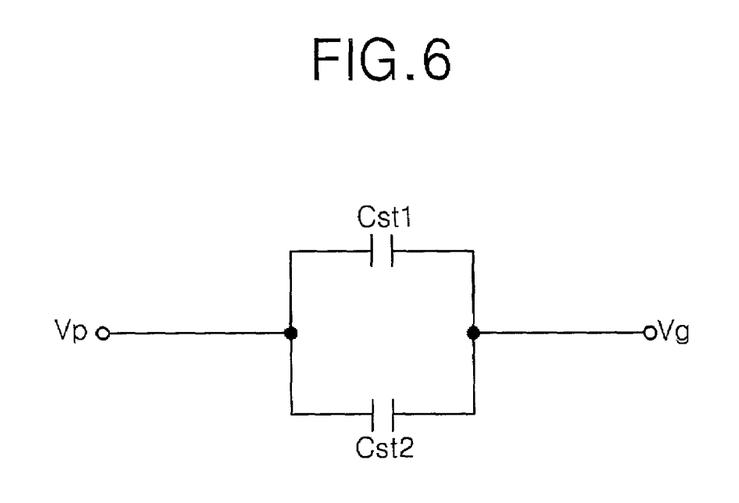
FIG. 6 is a circuit diagram of the first and second capacitors shown in FIG. 4.

The storage capacitor Cs charges a voltage in an application period of a gate high voltage to the pre-stage gate line 32 while discharging the charged voltage in an application period of a data signal to the pixel electrode, thereby preventing a voltage variation in the pixel electrode 22. The storage capacitor Cs consists of first and second storage capacitors Cst1 and Cst2 connected, in parallel, between a capacitor voltage Vp and a gate voltage Vg as shown in FIG. 6.

The first storage capacitor Cst1 comprises the gate line 32, and a storage electrode 54 which overlaps with the gate line 32 and having a gate insulating film 42 disposed therebetween. The storage electrode 54 is electrically connected, via a first storage contact hole 56a passing through the protective film 48, to the pixel electrode 52. The second storage capacitor Cst2 comprises the storage electrode 54, and the capacitor electrode 58 which overlaps with the storage electrode 54 and having the protective film 48 disposed therebetween. The capacitor electrode 58 is electrically connected, via second and third storage contact holes 56b and 56c passing through the protective film 48 and the gate insulating film 42, to the gate line 32.

The capacitance value of the entire storage capacitor Cs which consists of the first and second storage capacitors Cst1 and Cst2 connected in parallel in this manner is more increased by the capacitance value of the second storage capacitor Cst2 than the prior art as given in the following equation:

$$C_s = C_{st1} + C_{st2} \quad (2)$$

wherein, Cs represents the entire storage capacitor; Cst1 is the first storage capacitor; and Cst2 is the second storage capacitor.

Since the second storage capacitor Cst2 is formed with intervening protective layer 48 having a thickness of about 2000 Å, it can obtain a larger capacitance value at the same area than the conventional storage capacitor S formed with the intervening gate insulating film 42 having a thickness of about 4000 Å.

Figure 7:
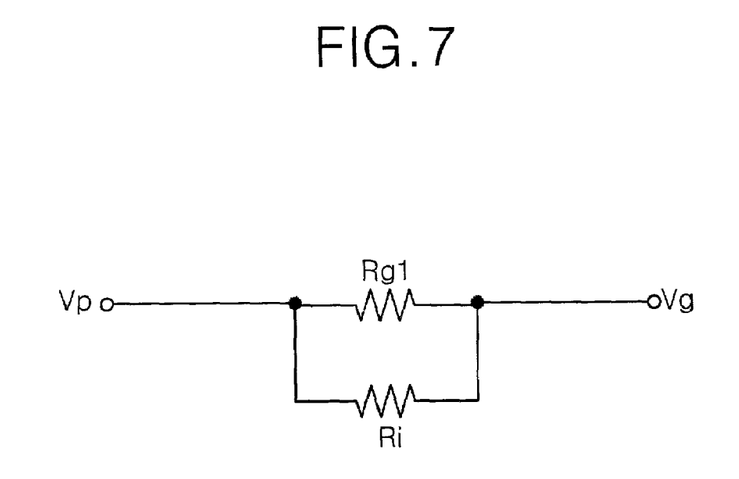
FIG. 7 is a circuit diagram of the gate resistor shown in FIG. 4.

In the mean time, a gate resistance is decreased by the capacitor electrode 58 having the same potential as the gate line 32 as seen from the following equation:

$$1/R_g = 1/R_{gl} + 1/R_i \quad (3)$$

wherein Rg represents an entire gate resistance; Rgl is a gate line resistance; and Ri is a capacitor electrode resistance.

FIG. 8A to FIG. 8E show a process of fabricating the lower substrate 31 of the LCD in FIG. 5 step-by-step, emphasizing the thin film transistor portion and the storage capacitor portion.

Figure 8A:
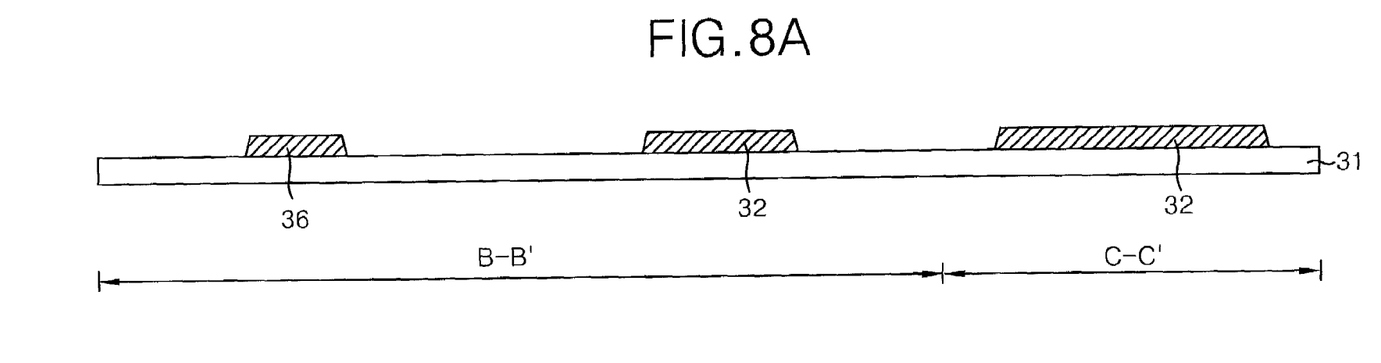

Referring to FIG. 8A, the gate line 32 and the gate electrode 36 are provided on the lower substrate 31 of the LCD.

The gate line 32 and the gate electrode 36 are formed by depositing aluminum (Al) or copper (Cu) onto the lower substrate 31 by a deposition technique such as sputtering, etc., and then they are patterned.

Figure 8B:
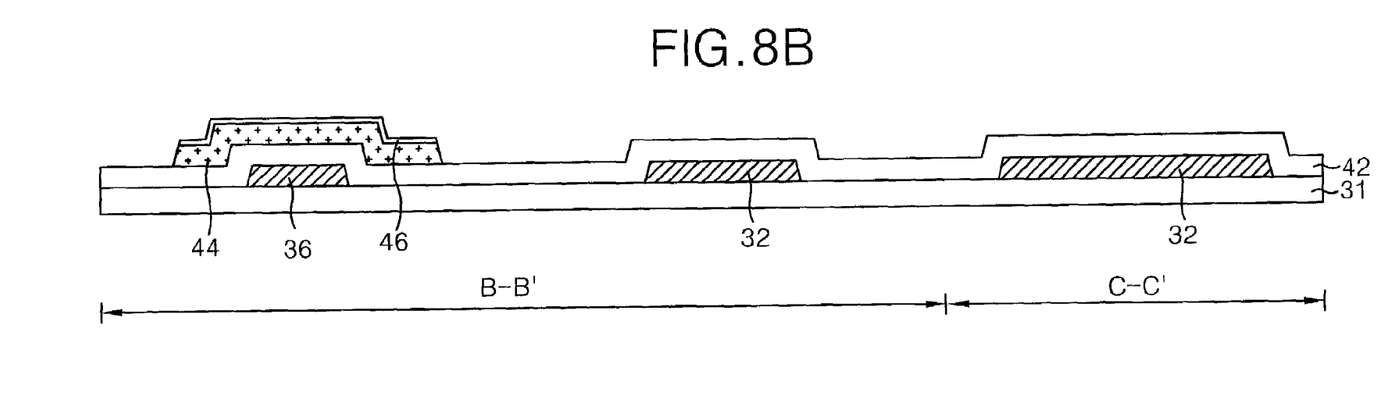

Referring to FIG. 8B, an active layer 44 and an ohmic contact layer 46 are formed on a gate insulating film 42.

The gate insulating film 42 is formed by depositing an insulating material onto the entire lower substrate 31 using the plasma enhanced chemical vapor deposition (PECVD) technique in such a manner as to cover the gate line 32 and the gate electrode 36. The active layer 44 and the ohmic contact layer 46 are formed by disposing the first and second semiconductor materials on the gate insulating film 42 and then patterning them.

The gate insulating film 42 is made from an insulating material such as silicon nitride ($SiN_x$) or silicon oxide ($SiO_x$). The active layer 44 is formed from amorphous silicon which is not doped with an impurity. On the other hand, the ohmic contact layer 46 is formed from amorphous silicon doped with an n-type or p-type impurity.

Figure 8C:
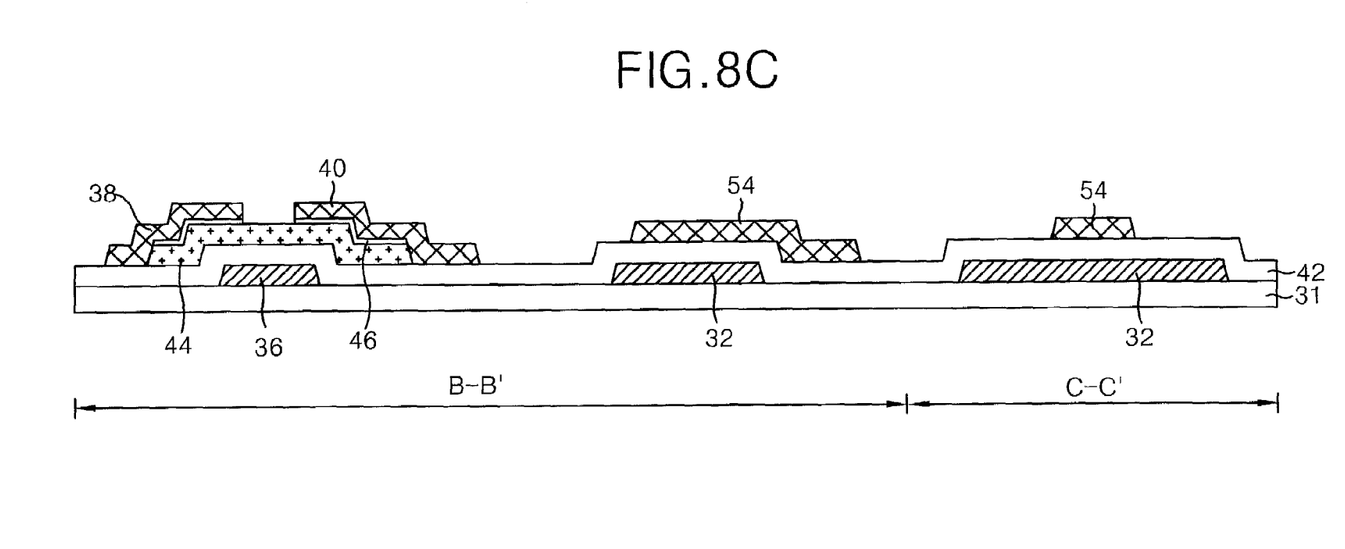

Referring to FIG. 8C, the storage electrode 54, the source electrode 38 and the drain electrode 40 are formed on the gate insulating film 42. The storage electrode 54, the source electrode 38 and the drain electrode 40 are formed by entirely depositing a metal layer using the CVD technique or the sputtering technique and then they are patterned. After the source electrode 38 and the drain electrode 40 are patterned, a portion of the ohmic contact layer 46 corresponding to the gate electrode 36 is also patterned to expose the active layer 44. A portion of the active layer 44 corresponding to the gate electrode 36 between the source electrode 38 and the drain electrode 40 defines a channel. The storage electrode 54, the source electrode 38 and the drain electrode 40 are made from molybdenum (Mo) or chromium (Cr), etc.

Figure 8D:
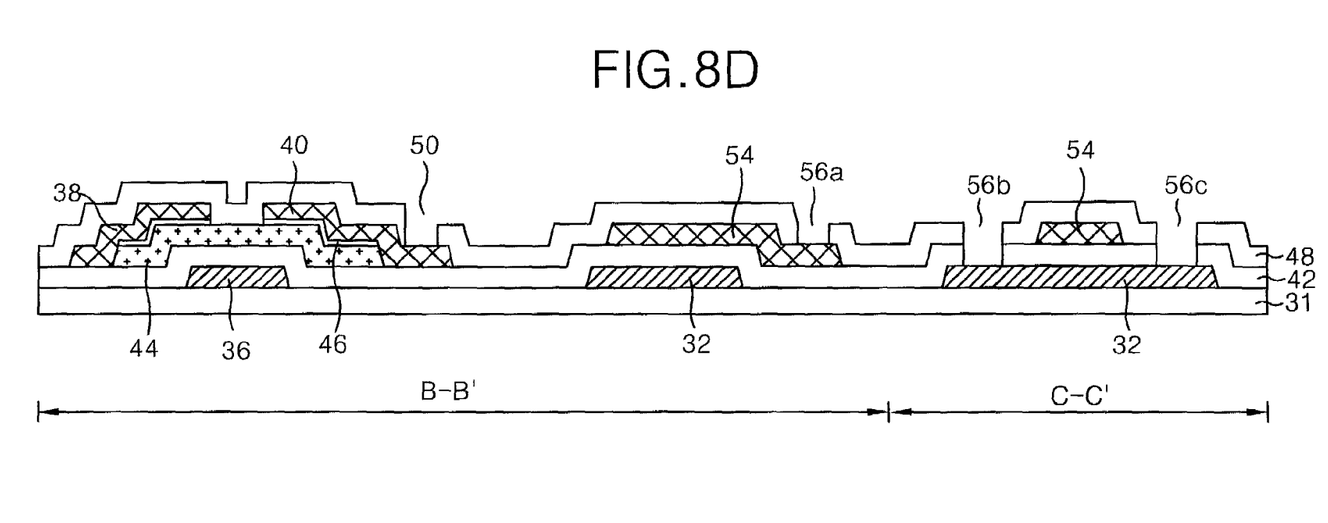

Referring to FIG. 8D, the protective layer 48 is provided on the gate insulating layer 42. The protective layer 48 is formed by depositing an insulating material onto the gate insulating layer 42 and then patterning it in such a manner as to cover the storage electrode 54, the source electrode 38 and the drain electrode 40. The drain contact hole 50 and the first storage contact hole 56a are formed in such a manner as to pass through the protective layer 48 to partially expose the surfaces of the drain electrode 40 and the storage electrode 54. Further, the second and third storage contact holes 56b and 56c are formed in such a manner as to pass through the protective layer 48 and the gate insulating layer 42 to partially expose the surface of the gate line 32.

The protective layer 48 is made from an inorganic insulating material such as silicon nitride ($SiN_x$) or silicon oxide ($SiO_x$), or an organic insulating material such as an acrylic organic compound, Teflon, BCB (benzocyclobutene), Cytop or PFCB (perfluorocyclobutane).

Figure 8E:
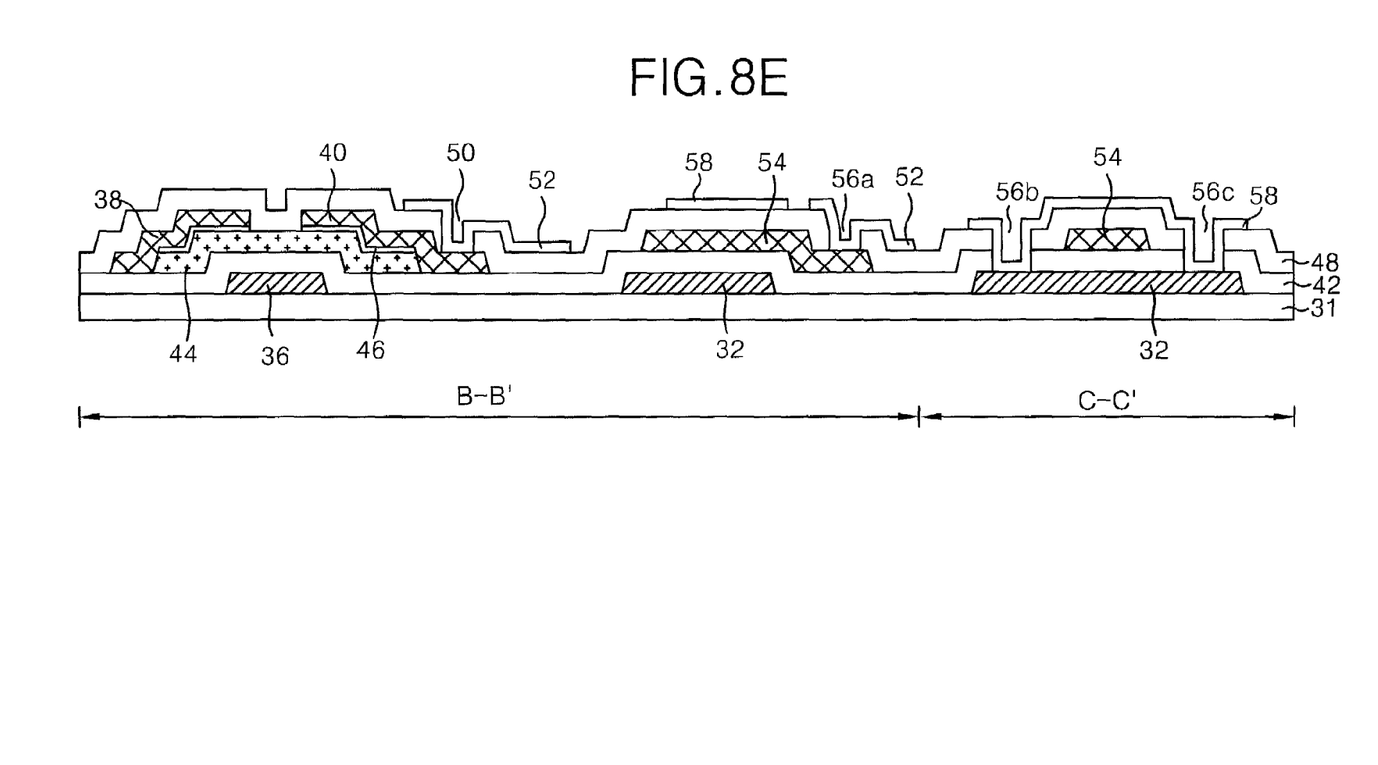

Referring to FIG. 8E, the pixel electrode 52 and the capacitor electrode 58 are provided on the protective layer 48. The pixel electrode 52 and the capacitor electrode 58 are formed by depositing a transparent conductive material onto the protective layer 48 and then patterning it.

The pixel electrode 52 electrically contacts the drain electrode 40 through the drain contact hole 50 and electrically contacts the storage electrode 54 through the first storage contact hole 56a. The capacitor electrode 58 is electrically connected, via the second and third storage contact holes 56b and 56c, to the gate line 32.

Each of the pixel electrode 52 and the capacitor electrode 58 is made from any one of indium-tin-oxide (ITO), indium-zinc-oxide (IZO) and indium-tin-zinc-oxide (ITZO).

As described above, according to the present invention, at least two storage capacitors disposed between the gate line and the capacitor electrode making the same potential as the gate line, are provided. Accordingly, a capacitance of the entire storage capacitor is enlarged due to a parallel connection of said at least two storage capacitors, so that a sustaining characteristic of voltage applied to the liquid crystal can be improved. Also, flicker and a cross talk are reduced to improve picture quality.

Although the present invention has been explained by the embodiments shown in the drawings described above, it should be understood to one skilled in the invention is not limited to the embodiments shown, but rather that various changes or modifications thereof are can be made without departing from the spirit and scope of the invention.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device having a pixel electrode, comprising:
   at least two storage capacitors disposed between a gate line and a capacitor electrode formed above the gate line, said gate line being connected, via a contact hole passing through said at least two storage capacitors, to the capacitor electrode, wherein the capacitor electrode is a different electrode than the pixel electrode.

2. A liquid crystal display device, comprising:
   at least two storage capacitors disposed between a gate line and a capacitor electrode formed above the gate line, said gate line being connected, via one contact hole passing through said at least two storage capacitors, to the capacitor electrode; and
   wherein the capacitor electrode is made from a transparent conductive material selected from the group consisting of indium-tin-oxide, indium-zinc-oxide and indium-tin-zinc-oxide.

3. A liquid crystal display device, comprising:
   at least two storage capacitors disposed between a gate line and a capacitor electrode formed above the gate line, said gate line being connected, via one contact hole passing through said at least two storage capacitors, to the capacitor electrode;
   a gate insulating film provided on a substrate;
   a storage electrode provided on the gate insulating film to overlap the gate line; and
   a protective layer provided between the storage electrode and the capacitor electrode.

4. A liquid crystal display device, comprising:
   at least two storage capacitors disposed between a gate line and a capacitor electrode formed above the gate line, said gate line being connected, via a contact hole passing through said at least two storage capacitors, to the capacitor electrode;
   a gate insulating film provided on a substrate;
   a storage electrode provided on the gate insulating film to overlap the gate line;
   a protective layer provided between the storage electrode and the capacitor electrode;
   a first storage capacitor provided between the storage electrode and the gate line with the intervening gate insulating film; and
   a second storage capacitor provided between the storage electrode and the capacitor electrode with the intervening protective layer.

5. The liquid crystal display device as claimed in claim 4, wherein the first storage capacitor is connected to the second storage capacitor in parallel.

6. The liquid crystal display device as claimed in claim 4, wherein the contact hole is at least two holes spaced to each other at a length larger than the width of the storage electrode.

7. The liquid crystal display device as claimed in claim 6, wherein the capacitor electrode has a length larger than the storage electrode.

8. The liquid crystal display device as claimed in claim 3, further comprising:
   a gate electrode connected to the gate line;
   source and drain electrodes provided on the gate insulating film; and
   a pixel electrode provided on the protective layer to be electrically connected to the drain electrode.

9. The liquid crystal display device as claimed in claim 3, wherein the pixel electrode electrically contacts the storage electrode through said contact hole passing through the protective layer.

10. The liquid crystal display device as claimed in claim 8, wherein the gate insulating film has a thickness of about 4000 Å.

11. The liquid crystal display device as claimed in claim 8, wherein the protective layer has a thickness of about 2000 Å.

12. A method of fabricating a liquid crystal display device, comprising the steps of:
    forming a gate line on a substrate;
    forming a gate insulating film on the substrate;
    forming a storage electrode on the gate insulating film to overlap the gate line;
    forming a protective layer made of an insulating material on the gate insulating film;
    defining at least two contact holes to expose the gate line; and
    forming a capacitor electrode electrically contacting the gate line on the protective layer,
    wherein the said least two contact holes are spaced to each other at a length larger than the width of the storage electrode.

13. The method as claimed in claim 12, wherein the capacitor electrode has a length larger than the storage electrode.

14. A method of fabricating a liquid crystal display device, comprising the steps of:
    forming a gate line on a substrate;
    forming a gate insulating film on the substrate;
    forming a storage electrode on the gate insulating film to overlap the gate line;
    forming a protective layer made of an insulating material on the gate insulating film;
    defining at least two contact holes to expose the gate line; and
    forming a capacitor electrode electrically contacting the gate line on the protective layer,
    further comprising the steps of:
    forming a gate electrode connected to the gate line on the substrate;
    forming a semiconductor layer on the gate insulating film;
    forming source and drain electrodes on the semiconductor layer; and
    forming a pixel electrode on the protective layer.

15. The method as claimed in claim 14, wherein the pixel electrode electrically contacts the storage electrode through said contact hole passing through the protective layer.

16. The method as claimed in claim 14, wherein the gate insulating film has a thickness of about 4000 Å.

17. The method as claimed in claim 14, wherein the protective layer has a thickness of about 2000 Å.

18. A liquid crystal display device, comprising:
    at least two storage capacitors disposed between a gate line and a capacitor electrode formed above the gate line, said gate line being directly connected, via one contact hole passing through said at least two storage capacitors, to a capacitor electrode of only one of the two storage capacitors.

19. A liquid crystal display device having an uppermost electrode, comprising:
- at least two storage capacitors disposed between a gate line and a capacitor electrode formed above the gate line, said gate line being directly connected, via one contact hole passing through said at least two storage capacitors, to the capacitor electrode which is the uppermost electrode.

20. A liquid crystal display device, comprising:
- at least two storage capacitors disposed vertically above one another between a gate line and a capacitor electrode formed above the gate line, said gate line being connected, via one contact hole passing through said at least two storage capacitors, to the capacitor electrode; and
- wherein the capacitor electrode is made from a transparent conductive material selected from the group consisting of indium-tin-oxide, indium-zinc-oxide and indium-tin-zinc-oxide.

* * * * *